(12) United States Patent
Kato (10) Patent No.: US 11,489,238 B2
(45) Date of Patent: Nov. 1, 2022

(54) STACKED BATTERY

(71) Applicant: TOYOTA JIDOSHA KABUSHIKI KAISHA, Toyota (JP)

(72) Inventor: Yuki Kato, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 4 days.

(21) Appl. No.: 16/384,201

(22) Filed: Apr. 15, 2019

(65) Prior Publication Data

US 2019/0379029 A1    Dec. 12, 2019

(30) Foreign Application Priority Data

Jun. 8, 2018  (JP) .............................. JP2018-110589

(51) Int. Cl.
*H01M 50/538* (2021.01)
*H01M 50/502* (2021.01)
(Continued)

(52) U.S. Cl.
CPC ......... *H01M 50/538* (2021.01); *H01M 4/667* (2013.01); *H01M 10/0585* (2013.01);
(Continued)

(58) Field of Classification Search
CPC .. H01M 2/263; H01M 2/202; H01M 10/0585; H01M 2004/029; H01M 10/044;
(Continued)

(56) References Cited

U.S. PATENT DOCUMENTS

| 5,114,807 A * | 5/1992 | Rowlette ............. H01M 50/543 |
| | | 429/152 |
| 6,235,426 B1 * | 5/2001 | Yanai .................... H01M 2/263 |
| | | 429/211 |

(Continued)

FOREIGN PATENT DOCUMENTS

| JP | 2008-198492 A | 8/2008 |
| JP | 2015-018670 A | 1/2015 |

(Continued)

OTHER PUBLICATIONS

Yoshiyuki Gambe, Yan Sun & Itaru Honma, "Development of Bipolar All-solid-state Lithium Battery Based on Quasi-solid-state Electrolyte Containing Tetraglyme-LiTFSA Equimolar Complex", Scientific Reports 8869, pp. 1-4, DOI: 10.1038/srep08869 (Year: 2015).*

(Continued)

*Primary Examiner* — Matthew T Martin
*Assistant Examiner* — Jessie L. Walls
(74) *Attorney, Agent, or Firm* — Sughrue Mion, PLLC (57) ABSTRACT

To suppress heat generation in a stacked battery including a plurality of electric elements in internal short circuits and an unstable reaction when the battery is operated while an energy level is increased, the stacked battery includes a stack comprising a first current collector layer, a second current collector layer, a plurality of bipolar current collector layers that are arranged between the first and second current collector layers at intervals in the stacking direction, a plurality of electric elements, an anode active material layer, and an electrolyte layer that is arranged between the cathode and anode active material layers, where the ratio h/S (cm$^{-1}$) of a length h (cm) between the one end face and the other end face in the stacking direction of the stack to an electrode (Continued)

area S (cm²) on a cross section orthogonal to the stacking direction of the stack is more than 1.

6 Claims, 5 Drawing Sheets

(51) Int. Cl.
    *H01M 10/0585*      (2010.01)
    *H01M 4/02*      (2006.01)
    *H01M 4/66*      (2006.01)
    *H01M 50/411*      (2021.01)

(52) U.S. Cl.
    CPC ....... *H01M 50/411* (2021.01); *H01M 50/502* (2021.01); *H01M 2004/029* (2013.01)

(58) Field of Classification Search
    CPC ........... H01M 10/0418; H01M 50/538; H01M 4/667; H01G 11/72
    See application file for complete search history.

(56) References Cited

U.S. PATENT DOCUMENTS

| | | | | |
|---|---|---|---|---|
| 2004/0219428 | A1* | 11/2004 | Nagayama | H01M 4/581 429/210 |
| 2004/0253512 | A1* | 12/2004 | Watanabe | H01M 4/131 429/210 |
| 2009/0159582 | A1* | 6/2009 | Chami | H01M 10/0418 29/623.5 |
| 2012/0156552 | A1* | 6/2012 | Miyazaki | H01M 2/22 429/179 |
| 2014/0113180 | A1* | 4/2014 | Nakai | H01M 10/052 429/160 |
| 2014/0227562 | A1* | 8/2014 | Kamizori | H01M 10/052 429/7 |
| 2014/0272538 | A1* | 9/2014 | Mitchell | H01G 11/68 429/152 |
| 2015/0064533 | A1* | 3/2015 | Christensen | H01M 10/0562 429/120 |
| 2016/0056497 | A1* | 2/2016 | Oh | H01M 2/0287 429/161 |
| 2016/0111755 | A1* | 4/2016 | Liu | H01M 10/36 429/152 |
| 2017/0092967 | A1* | 3/2017 | Ko | B60L 58/32 |
| 2018/0026301 | A1 | 1/2018 | Ebisuzaki et al. | |
| 2018/0287209 | A1* | 10/2018 | Hasegawa | H01M 50/209 |
| 2018/0294471 | A1* | 10/2018 | Hasegawa | H01M 10/0525 |
| 2018/0309163 | A1* | 10/2018 | Kim | H01M 2/14 |

FOREIGN PATENT DOCUMENTS

| | | | |
|---|---|---|---|
| JP | 2016-136490 A | | 7/2016 |
| JP | 2016-173915 A | | 9/2016 |
| JP | 2018-014286 A | | 1/2018 |
| KR | 20050090748 A | * | 9/2005 .......... H01M 10/637 |

OTHER PUBLICATIONS

Energizer A23 Product Datasheet, Form No. EBC-4412H, Energizer Holdings Inc. (Year: 2015).*

* cited by examiner

STACKED BATTERY

FIELD

The present application discloses a stacked battery having a bipolar structure.

BACKGROUND

A stacked battery of stacking a plurality of electric elements each including a cathode current collector layer, a cathode active material layer, an electrolyte layer, an anode active material layer and an anode current collector layer is known as disclosed in Patent Literatures 1 to 3. Such a technique is also known that a Positive Temperature Coefficient (PTC) layer is provided between a current collector layer and an active material layer, and the resistance of the PTC layer is increased when heat is generated in a battery, which prevents, for example, an excessive temperature increase in the battery, as disclosed in Patent Literature 4.

CITATION LIST

Patent Literature

Patent Literature 1: JP 2016-136490 A
Patent Literature 2: JP 2015-018670 A
Patent Literature 3: JP 2008-198492 A
Patent Literature 4: JP 2018-014286 A

SUMMARY

Technical Problem

High-energy electrical storage devices have been demanded in recent years. For example, a battery capacity and an apparent capacitance of a stacked battery are increased, which makes it possible to secure a high energy level. However, when internal short circuits occur in a battery, increasing a battery capacity and a capacitance leads to concentration of electric power that is stored in the battery at a short-circuiting portion to easily generate heat, which is problematic. Alternatively, enlarging an electrode area in a stacked battery may lead to a secured high energy level. However, enlarging an electrode area easily leads to an unstable reaction (unstable current) when a battery is operated and cycle characteristics deteriorate, which is problematic.

Solution to Problem

The present application discloses, as one means for solving the problems, a stacked battery comprising a stack, wherein the stack comprises a first current collector layer that composes one end face in a stacking direction of the stack, a second current collector layer that composes another end face in the stacking direction, a plurality of bipolar current collector layers that are arranged between the first and second current collector layers at intervals in the stacking direction, and a plurality of electric elements that are electrically connected to each other in series via the bipolar current collector layers between the first and second current collector layers, each of the electric elements comprises a cathode active material layer, an anode active material layer, and an electrolyte layer that is arranged between the cathode and anode active material layers, and a ratio $h/S$ ($cm^{-1}$) of a length $h$ (cm) between the one end face and the other end face in the stacking direction of the stack to an electrode area $S$ ($cm^2$) on a cross section orthogonal to the stacking direction of the stack is more than 1.

In the stacked battery of the present disclosure, the ratio $h/S$ ($cm^{-1}$) may be more than 10.

The stacked battery of the present disclosure may further comprise: a third current collector layer that is arranged on an outer side than the first current collector layer, in addition to the stack.

In this case, a fuse or a PTC layer may be provided between the first and third current collector layers.

The stacked battery of the present disclosure may further comprise: a fourth current collector layer that is arranged on an outer side than the second current collector layer, in addition to the stack.

In this case, a fuse or a PTC layer may be provided between the second and fourth current collector layers.

In the stacked battery of the present disclosure, a capacity is preferably no more than 0.32 Ah.

In the stacked battery of the present disclosure, a capacitance is preferably no more than 0.01 Ah/V.

In the stacked battery of the present disclosure, a voltage is preferably 10 V to 2000 V.

In the stacked battery of the present disclosure, the electrode area S is preferably 1 $cm^2$ to 10 $cm^2$.

In the stacked battery of the present disclosure, preferably, a thickness of the cathode active material layer is 20 µm to 2 mm, and a thickness of the anode active material layer is 20 µm to 2 mm.

In the stacked battery of the present disclosure, the electrolyte layer is preferably a solid electrolyte layer.

Advantageous Effects

According to the stacked battery of this disclosure, having the ratio h/S of a length h in the stacking direction of a stack to an electrode area S of more than 1 makes it easy to suppress heat generation in the battery in internal short circuits and an unstable reaction when the battery is operated, while securing a high energy level.

DETAILED DESCRIPTION OF EMBODIMENTS

1. Stacked Battery 100

Figure 1:
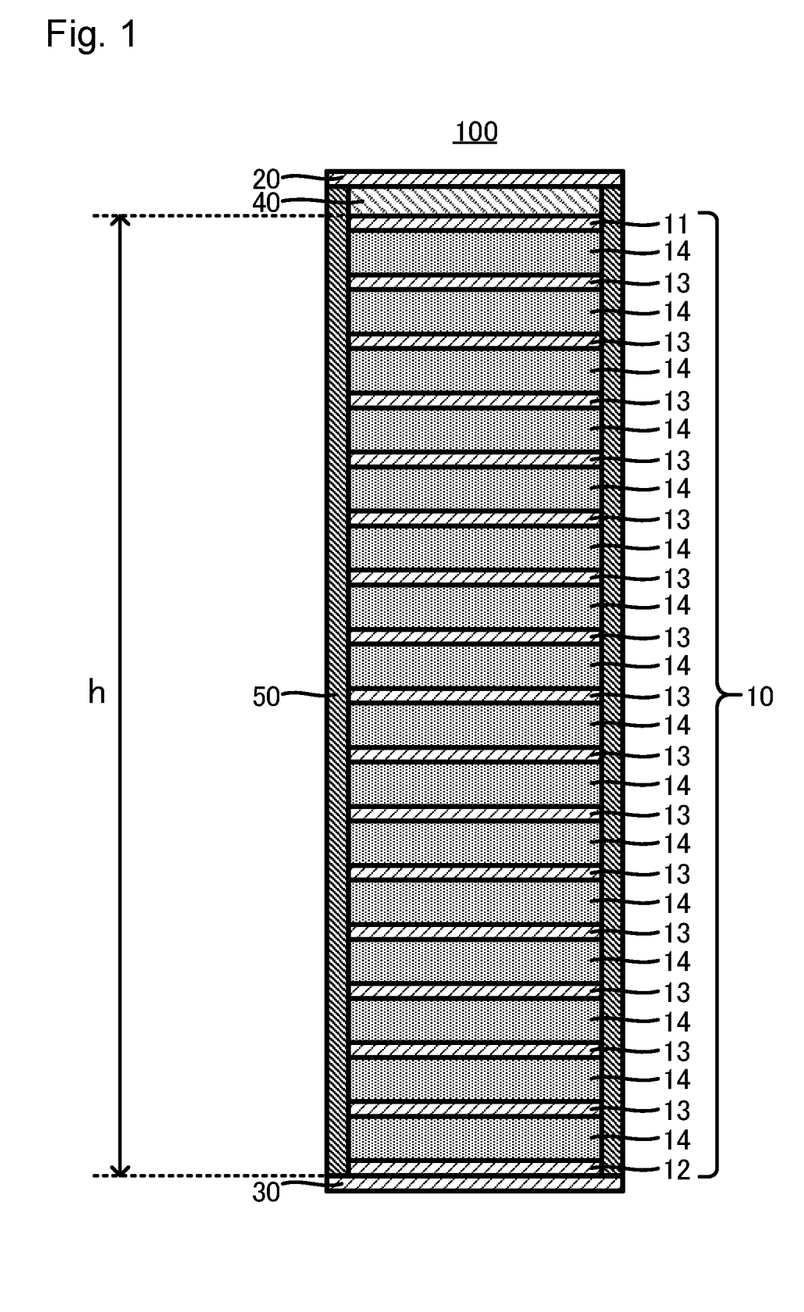
FIG. 1 is an explanatory schematic view of one example of structure of layers of a stacked battery 100.
Figure 2:
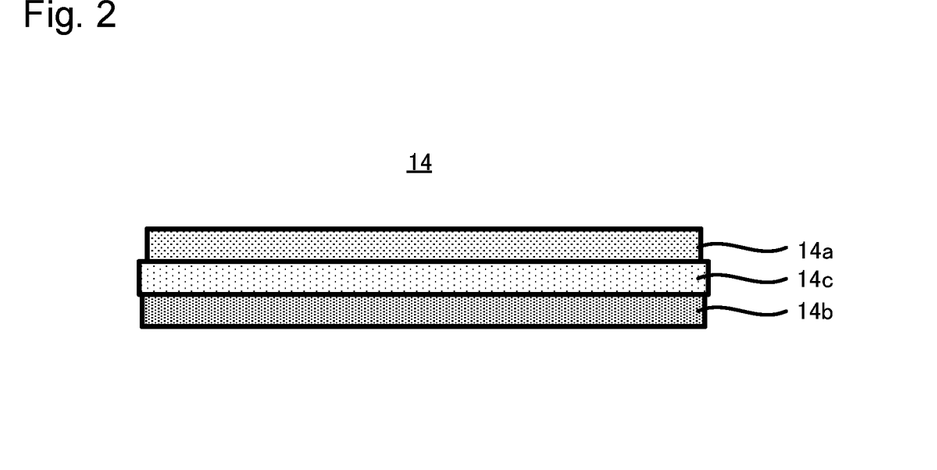
FIG. 2 is an explanatory schematic view of one example of structure of layers of an electric element 14.

FIG. 1 schematically shows structure of layers of a stacked battery 100. FIG. 2 schematically shows structure of layers of an electric element 14 that is a component of the stacked battery 100. As shown in FIGS. 1 and 2, the stacked battery 100 includes a stack 10. The stack 10 comprises a first current collector layer 11 that composes one end face in a stacking direction of the stack, a second current collector layer 12 that composes another end face in the stacking direction, a plurality of bipolar current collector layers 13, 13, . . . that are arranged between the first and second current collector layers 11 and 12 at intervals in the stacking direction, and a plurality of electric elements 14, 14, . . . that are electrically connected to each other in series via the bipolar current collector layers 13, 13, . . . between the first and second current collector layers 11 and 12. Each of the electric elements 14 comprises a cathode active material layer 14a, an anode active material layer 14b, and an electrolyte layer 14c that is arranged between the cathode and anode active material layers 14a and 14b. Here, one feature of the stacked battery 100 is that the ratio h/S (cm$^{-1}$) of a length h (cm) between the one end face and the other end face in the stacking direction of the stack 10 to an electrode area S (cm$^2$) on a cross section orthogonal to the stacking direction of the stack 10 is more than 1.

1.1. First Current Collector Layer 11

The first current collector layer 11 may be composed of metal foil, a metal mesh, etc., and is especially preferably composed of metal foil. Examples of metal constituting the first current collector layer 11 include Cu, Ni, Cr, Au, Pt, Ag, Al, Fe, Ti, Zn, Co and stainless steel. The first current collector layer 11 may have some coating layer over its surface for adjusting resistance. The thickness of the first current collector layer 11 is not specifically limited, and for example, is preferably 0.1 μm to 1 mm, and is more preferably 1 μm to 100 μm.

1.2. Second Current Collector Layer 12

The second current collector layer 12 may be composed of metal foil, a metal mesh, etc., and is especially preferably composed of metal foil. Examples of metal constituting the second current collector layer 12 include Cu, Ni, Cr, Au, Pt, Ag, Al, Fe, Ti, Zn, Co and stainless steel. The first current collector layer 11 and the second current collector layer 12 may be constituted of either the same metal or different metals. The second current collector layer 12 may have some coating layer over its surface for adjusting resistance. The thickness of the second current collector layer 12 is not specifically limited, and for example, is preferably 0.1 μm to 1 mm, and is more preferably 1 μm to 100 μm.

1.3. Bipolar Current Collector Layer 13

The bipolar current collector layer 13 may be composed of metal foil, a metal mesh, etc., and is especially preferably composed of metal foil. Examples of metal constituting the bipolar current collector layer 13 include Cu, Ni, Cr, Au, Pt, Ag, Al, Fe, Ti, Zn, Co and stainless steel. The first current collector layer 11, the second current collector layer 12 and the bipolar current collector layer 13 may be constituted of either the same metal or different metals. The bipolar current collector layer 13 may have some coating layer over its surface for adjusting resistance. A plurality of sheets of metal foil may compose the bipolar current collector layers 13. In this case, these sheets of the metal foil may be either the same kind or different kind. The thickness of the bipolar current collector layer 13 is not specifically limited, and for example, is preferably 0.1 μm to 1 mm, and is more preferably 1 μm to 100 μm.

1.4. Electric Element 14

As shown in FIG. 2, the cathode active material layer 14a, the electrolyte layer 14c and the anode active material layer 14b are stacked to form the electric element 14. In FIG. 2, the electric element 14 can function as a single cell. In the stacked battery 100, a plurality of such electric elements 14 are stacked via the bipolar current collector layers 13, to compose the stack 10.

1.4.1 Cathode Active Material Layer 14a

The cathode active material layer 14a is a layer containing at least an active material. When the stacked battery 100 is a solid-state battery, the cathode active material layer 14a may further contain a solid electrolyte, a binder, a conductive additive, etc. optionally, in addition to an active material. When the stacked battery 100 is a battery of an electrolyte solution system, the cathode active material layer 14a may further contain a binder, a conductive additive, etc. optionally, in addition to an active material. A known active material may be used. One may select two materials different in electric potential at which a predetermined ion is stored/released (charge/discharge potential) among known active materials, to use a material displaying a noble potential as a cathode active material, and a material displaying a base potential as an anode active material described later. For example, when a lithium ion battery is composed, any lithium-containing composite oxide such as lithium cobaltate, lithium nickelate, $LiNi_{1/3}Co_{1/3}Mn_{1/3}O_2$, lithium manganate and a spinel lithium compound may be used as a cathode active material. When the stacked battery 100 is a solid-state battery, a surface of a cathode active material may be coated with an oxide layer such as a lithium niobate layer, a lithium titanate layer and a lithium phosphate layer. When the stacked battery 100 is a solid-state battery, a solid electrolyte is preferably an inorganic solid electrolyte because its ion conductivity is high compared with an organic polymer electrolyte. This is also because an inorganic solid electrolyte has a good heat resistance compared with an organic polymer electrolyte. This is also because an inorganic solid electrolyte is hard and has good rigidity compared with an organic polymer electrolyte, which makes it possible to more easily compose the stacked battery 100 of the present disclosure. Preferred examples of an inorganic solid electrolyte include oxide solid electrolytes such as lithium lanthanum zirconate, LiPON, $Li_{1+X}Al_XGe_{2-X}(PO_4)_3$, Li—SiO based glass and Li—Al—S—O based glass; and sulfide solid electrolytes such as $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$ and $Li_2S$—$P_2S_5$—$GeS_2$. Especially, sulfide solid electrolytes are preferable, sulfide solid electrolytes containing $Li_2S$—$P_2S_5$ are more preferable, and sulfide solid electrolytes containing $Li_2S$—$P_2S_5$—LiI—LiBr are further preferable. Examples of a binder that may be contained in the cathode active material layer 14a include butadiene rubber (BR), butyl rubber (IIR), acrylate-butadiene rubber (ABR) and polyvinylidene difluoride (PVdF). Examples of a conductive additive that may be contained in the cathode active material layer 14a include carbon materials such as acetylene black and Ketjenblack, and metallic materials such as nickel, aluminum and stainless steel. The contents of the constituents in the cathode active material layer 14a may be the same as in a conventional one. The shape of the cathode active material layer 14a may be the same as a conventional one as well. Specifically, from the viewpoint that the stacked battery 100 can be easily composed, the cathode active material layer 14a in the form of a sheet is preferable. In this case, the cathode active material layer 14a is preferably thicker than a conventional one. This is because short circuits of current collector layers to each other can be suppressed and heat generation in internal short circuits can be further suppressed when some extraneous material contaminates the battery. For example, the thickness of the cathode active material layer 14a is preferably 20 μm to 2 mm. The lower limit thereof is more preferably no less than 100 μm, and the upper limit thereof is more preferably no more than 1 mm.

1.4.2. Anode Active Material Layer 14b

The anode active material layer 14b is a layer containing at least an active material. When the stacked battery 100 is a solid-state battery, the anode active material layer 14b may further contain a solid electrolyte, a binder, a conductive additive, etc. optionally, in addition to an active material. When the stacked battery 100 is a battery of an electrolyte solution system, the anode active material layer 14b may further contain a binder, a conductive additive, etc. optionally, in addition to an active material. A known active material may be used. One may select two materials different in electric potential at which a predetermined ion is stored/released (charge/discharge potential) among known active materials, to use a material displaying a noble potential as a cathode active material described above, and a material displaying a base potential as an anode active material. For example, when a lithium ion battery is made, a silicon-based active material such as Si, Si alloys and silicon oxide; a carbon-based active material such as graphite and hard carbon; any oxide-based active material such as lithium titanate; lithium metal or a lithium alloy; or the like may be used as an anode active material. A solid electrolyte, a binder, and a conductive additive may be properly selected from ones that are the examples as those used in the cathode active material layer 14a, to be used. The contents of the constituents in the anode active material layer 14b may be the same as in a conventional one. The shape of the anode active material layer 14b may be the same as a conventional one as well. Specifically, from the viewpoint that the stacked battery 100 can be easily composed, the anode active material layer 14b in the form of a sheet is preferable. In this case, the anode active material layer 14b is preferably thicker than a conventional one. This is because short circuits of current collector layers to each other can be suppressed and heat generation in internal short circuits can be further suppressed when some extraneous material contaminates the battery. For example, the thickness of the anode active material layer 14b is preferably 20 μm to 2 mm. The lower limit thereof is more preferably no less than 100 μm, and the upper limit thereof is more preferably no more than 1 mm.

1.4.3. Electrolyte Layer 14c

The electrolyte layer 14c is a layer containing at least an electrolyte. When the stacked battery 100 is a solid-state battery, the electrolyte layer 14c may be a solid electrolyte layer containing a solid electrolyte, and optionally a binder. This solid electrolyte is preferably an inorganic solid electrolyte described above. Especially, when the stacked battery 100 is a sulfide solid-state battery, the electrolyte layer 14c preferably contains a sulfide solid electrolyte. In this case, a sulfide solid electrolyte contained in the electrolyte layer 14c is preferably a sulfide solid electrolyte containing $Li_2S$—$P_2S_5$, and more preferably a sulfide solid electrolyte containing $Li_2S$—$P_2S_5$—LiI—LiBr. The binder same as one used in the cathode active material layer 14a may be properly selected to be used. The contents of the constituents in the electrolyte layer 14c may be the same as in a conventional one. The shape of the electrolyte layer 14c may be the same as a conventional one as well. Specifically, from the viewpoint that the stacked battery 100 can be easily composed, the electrolyte layer 14c in the form of a sheet is preferable. In this case, the thickness of the solid electrolyte layer 14c is, for example, preferably 0.1 μm to 1 mm, and more preferably 1 μm to 100 μm. On the other hand, when the stacked battery 100 is a battery of an electrolyte solution system, the electrolyte layer 14c contains an electrolyte solution and a separator. These electrolyte solution and separator are obvious for the person skilled in the art, and thus detailed description thereof is omitted here. The electrolyte layer 14c is preferably a solid electrolyte layer. That is, the stacked battery 100 is preferably a solid-state battery. This is because the electrolyte layer 14c of a solid electrolyte layer makes it easier to compose the stacked battery 100. The electrolyte layer 14c is especially preferably a sulfide solid electrolyte layer. That is, the stacked battery 100 is preferably a sulfide solid-state battery. In a sulfide solid-state battery, generally, a constraint pressure is necessary to be applied to the electric element 14 in the stacking direction by a constraining member, which easily raises the problem of an unstable current. In contrast, in the stacked battery 100 of this disclosure, such an unstable current is easy to be suppressed as described later.

1.5. Stack 10

As described above, the first current collector layer 11, the second current collector layer 12, a plurality of the bipolar current collector layers 13, 13, . . . and a plurality of the electric elements 14, 14, . . . are stacked to form the stack 10. Needless to say, in the stack 10, a plurality of the bipolar current collector layers 13, 13, . . . and a plurality of the electric elements 14, 14, . . . are directly stacked onto each other. One feature of the stacked battery 100 of the present disclosure is that the ratio h/S ($cm^{-1}$) of the length h (cm) between the one end face (a surface of the first current collector layer 11 on one end side) and the other end face (a surface of the second current collector layer 12 on the other end side) in the stacking direction of the stack 10 having such a structure (a surface of the first current collector layer 11 on one end side) to the electrode area S ($cm^2$) on a cross section orthogonal to the stacking direction of the stack is more than 1. The ratio h/S ($cm^{-1}$) is especially preferably more than 10. The upper limit of the ratio h/S ($cm^{-1}$) is not specifically limited, and for example, is preferably no more than 100, and is more preferably no more than 30.

1.5.1. Electrode Area S

Figure 3:
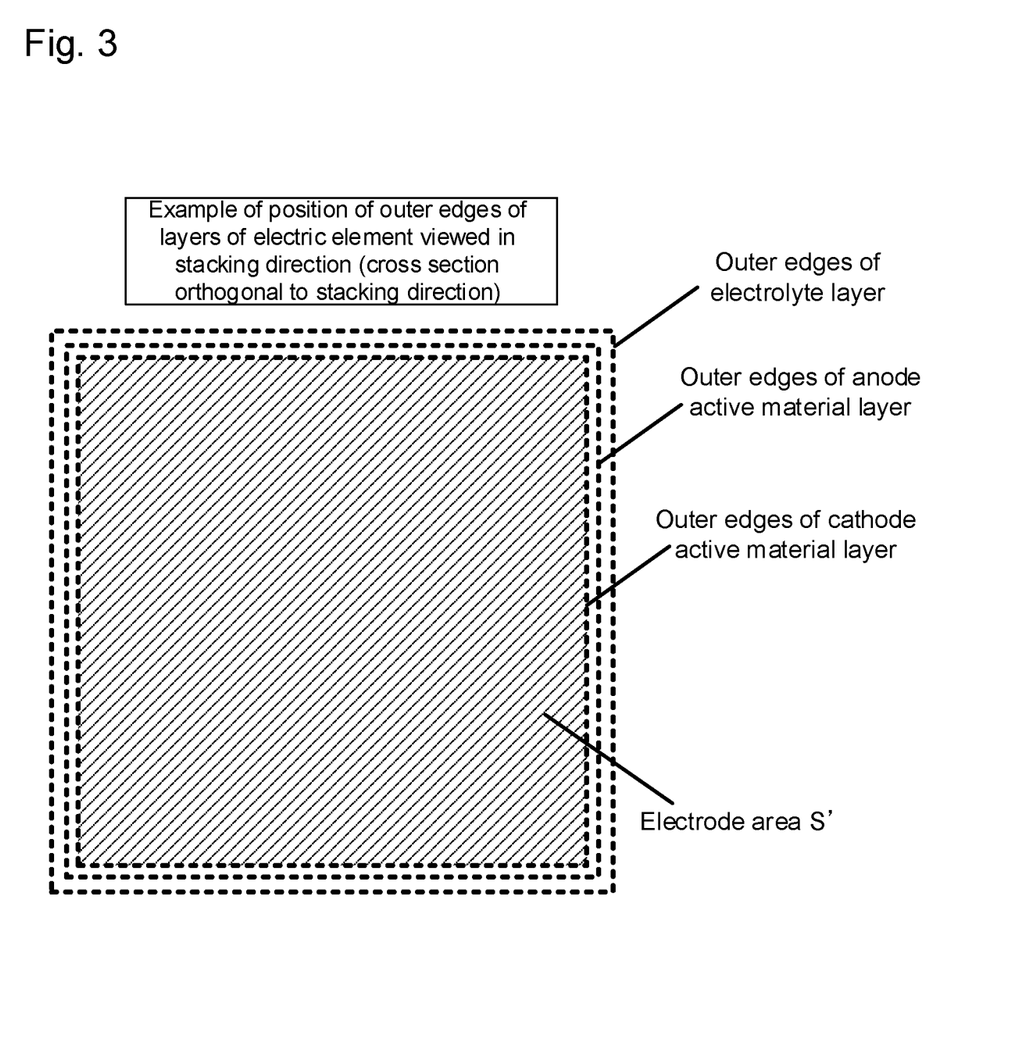
FIG. 3 is an explanatory schematic view of an electrode area S.

The electrode area S ($cm^2$) in the stacked battery 100 of the present disclosure is defined as follows: that is, as shown in FIG. 3, an area of an overlapping portion of all the cathode active material layer 14a, the anode active material layer 14b and the electrolyte layer 14c of the electric element 14 viewed in the stacking direction of the stack 10 is defined as an electrode area S'($cm^2$) of the electric element; and electrode areas S'($cm^2$) of all of a plurality of the electric elements 14, 14, . . . that compose the stack 10 are identified, and the maximum value thereof is recorded as "electrode area S ($cm^2$) on a cross section orthogonal to the stacking direction of the stack 10". The variation among the electrode areas S' of a plurality of the electric elements 14, 14, . . . is preferably as small as possible. For example, in a plurality of the electric elements 14, 14, . . . that compose the stack 10, the ratio (S'min/S'max) of the minimum value (S'min) and the maximum value (S'max) of the electrode areas S' is preferably 0.9 to 1.0, and more preferably 0.95 to 1.0.

FIG. 3 shows such an embodiment that the outer edges of the anode active material layer 14b are encompassed inside those of the electrolyte layer 14c and the outer edges of the cathode active material layer 14a are encompassed inside those of the anode active material layer 14b viewed in the stacking direction, and as a result, the electrode area S' is the same as the area of the cathode active material layer 14a. The relationship between the magnitudes of the areas of the layers and positional relationship between the outer edges of the layers are not restricted to this embodiment.

In the stacked battery 100 of the present disclosure, a specific value of the electrode area S is not limited. In view of further suppressing an unstable current, easily securing a certain capacity, etc., the electrode area S is preferably 0.5 $cm^2$ to 100 $cm^2$. The lower limit thereof is more preferably no less than 1 cm$^2$, and the upper limit thereof is more preferably no more than 10 cm$^2$. A narrow electrode area S tends to lead to a low level of energy E (Wh) of a stacked battery. However, in the stacked battery 100 of the present disclosure, having the ratio h/S of more than 1 makes it possible to secure a high energy level as described above.

1.5.2. Length h

In the stacked battery 100 of the present disclosure, a specific value of the length h is not limited. Determining the electrode area S may determine the length h. For example, the length h is preferably 1 cm to 100 cm. The lower limit thereof is more preferably no less than 2 cm, and the upper limit thereof is more preferably no more than 30 cm.

1.5.3. Number of Electric Elements

The number of a plurality of the electric elements 14, 14, . . . included in the stack 10 may be such as to make it possible to achieve the ratio h/S. For example, the number of a plurality of the electric elements 14, 14, . . . is preferably 2 to 1000. The lower limit thereof is more preferably no less than 10, and the upper limit thereof is more preferably no more than 300.

1.5.4. Shape of Whole Stack

Figure 4A:
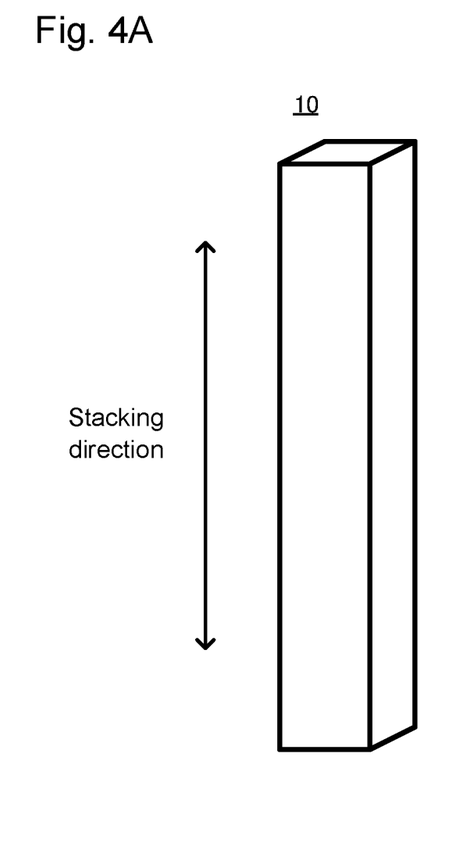
FIGS. 4A and 4B are explanatory schematic views of examples of the whole shape of a stack 10.
Figure 4B:
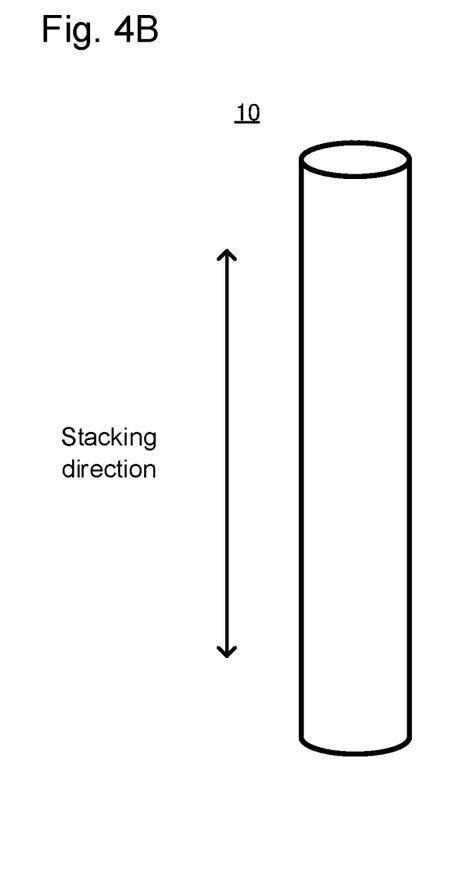

FIG. 3 shows the stack 10 having a quadrangle cross section (that is, the shape of the whole stack 10 is a quadratic prism as shown in FIG. 4A). The shape of the stack 10 is not limited to this. For example, as shown in FIG. 4B, the stack 10 may have either a columnar shape, or a shape other than those as shown in FIGS. 4A and 4B. In any case, the stack 10 may be formed of layers that are stacked onto each other in one direction.

1.6. Properties of Stacked Battery 100

Figure 5:
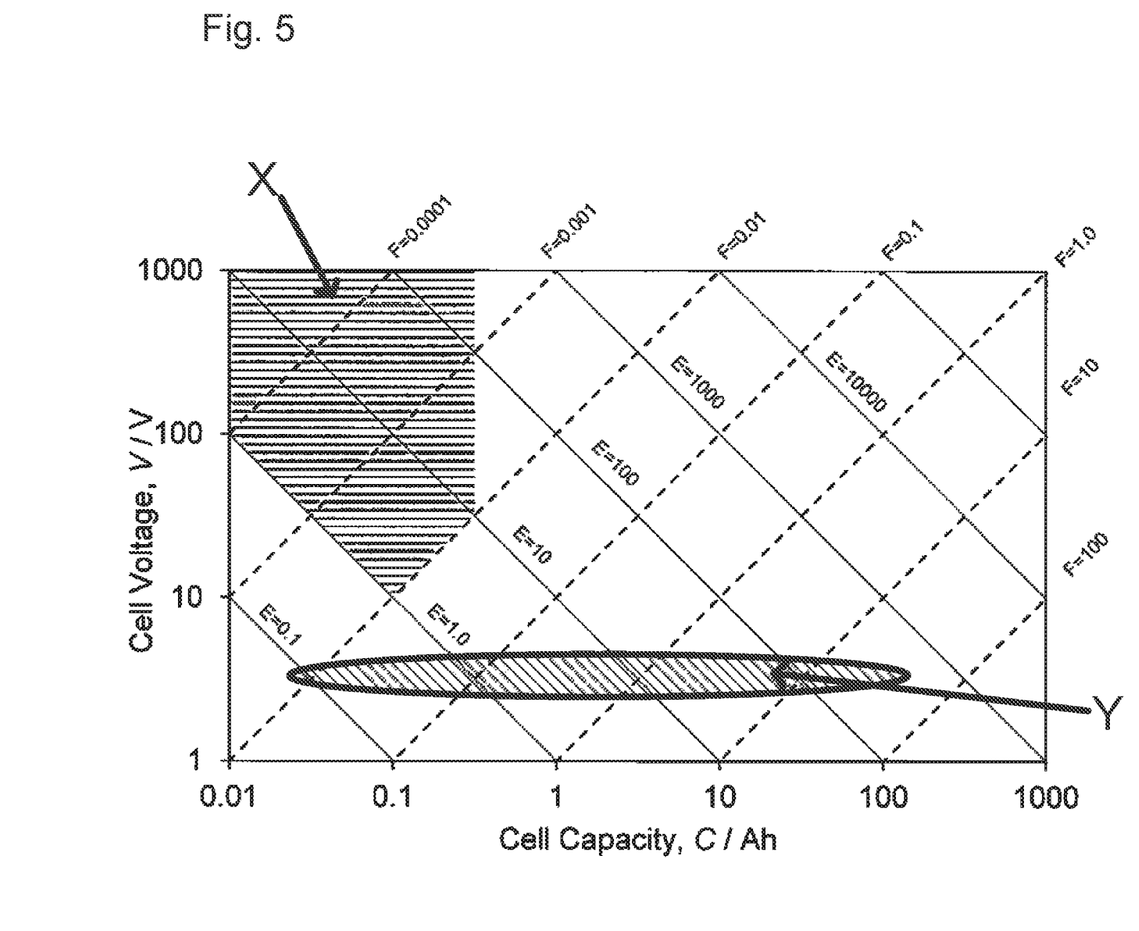
FIG. 5 is an explanatory graph of examples of preferred ranges of properties of stacked batteries.

One example of a preferred range of a capacity C, a voltage V, a capacitance F and energy E concerning properties of the stacked battery 100 is summarized as shown in FIG. 5. The area X in FIG. 5 is one example of a preferred range of properties of the stacked battery 100 of the present disclosure. The area Y in FIG. 5 is one example of properties of a conventionally known battery. As shown in FIG. 5, it can be said that the stacked battery 100 of the present disclosure has a small capacity C, a high voltage V, a small capacitance F, and energy E of the same level in a preferred embodiment compared to a conventionally known battery.

1.6.1. Capacity C

The capacity of the stacked battery 100 is preferably small. Specifically, the capacity of the stacked battery 100 is preferably no more than 1 Ah, more preferably no more than 0.5 Ah, and especially preferably no more than 0.32 Ah. The lower limit of the capacity of the stacked battery 100 is not specifically limited, and for example, is preferably no less than 1 mAh. A small capacity of the stacked battery 100 makes it possible to further suppress heat generation in short circuits. A capacity of a stacked battery is the same as that of an electric element. That is, this capacity is determined by sizes of a cathode active material layer and an anode active material layer. Here, a small capacity leads to a low level of energy E (Wh) of a stacked battery. However, in the stacked battery 100 of the present disclosure, having the ratio h/S of more than 1 makes it possible to secure a high energy level as described above.

1.6.2. Voltage V

The voltage of the stacked battery 100 is preferably 10 V to 2000 V. The lower limit of the voltage is more preferably no less than 40 V, and the upper limit thereof is more preferably no more than 400 V. The voltage within this range makes it easy to secure sufficient battery performance, and makes it easy to suppress sparks between current collector layers when the stacked battery is made. The voltage V of the stacked battery 100 can be calculated from the voltage of the electric element Vo, and the number of the electric elements (number of stacking) n, as V=n×Vo.

1.6.3. Capacitance F

The capacitance of the stacked battery 100 is preferably small. Specifically, the capacitance of the stacked battery 100 is preferably no more than 0.1 Ah/V, more preferably no more than 0.01 Ah/V, and especially preferably no more than 0.001 Ah/V. A small capacitance of the stacked battery 100 makes it possible to suppress heat generation in short circuits. The lower limit of the capacitance of the stacked battery 100 is not specifically limited, and for example, is preferably no less than 0.00001 Ah/V. The capacitance F can be calculated from the capacity C and the voltage V of the stacked battery 100, as F=C/V.

1.6.4. Energy E

As described above, the stacked battery 100 is such as to easily suppress heat generation in the battery in internal short circuits and an unstable reaction when the battery is operated, as increasing an energy level by having a high ratio h/S. A specific energy level of the stacked battery 100 is not restricted, and is preferably no less than 1 Wh, and is more preferably no less than 10 Wh, as a rough estimate. The upper limit of the energy E of the stacked battery 100 is not specifically restricted, and for example, is preferably no more than 100 Wh. The energy E can be calculated from the capacity C and the voltage V as E=C×V.

Preferably, at least one of the capacity C, the voltage V, the capacitance F and the energy E of the stacked battery 100 takes a value as described above. More preferably, all the capacity C, the voltage V, the capacitance F and the energy E take values as described above as shown in FIG. 5.

1.7. Other Components

The stacked battery 100 includes the stack 10. The stacked battery 100 may also include components other than the stack 10.

1.7.1. Third Current Collector Layer 20

For example, as shown in FIG. 1, the stacked battery 100 may include a third current collector layer 20 in addition to the stack 10. The third current collector layer 20 is arranged on the outer side than the first current collector layer 11 (opposite side to a side where the second current collector layer 12 is arranged in terms of the first current collector layer 11, outside the first current collector layer 11 in terms of the stacking direction). The third current collector layer 20 may be composed of metal foil, a metal mesh, etc., and is especially preferably composed of metal foil. Examples of metal constituting the third current collector layer 20 include Cu, Ni, Cr, Au, Pt, Ag, Al, Fe, Ti, Zn, Co and stainless steel. The thickness of the third current collector layer 20 is not specifically limited and for example, is preferably 0.1 μm to 1 mm, and is more preferably 1 μm to 100 μm.

1.7.2. Fourth Current Collector Layer 30

As shown in FIG. 1, the stacked battery 100 may include a fourth current collector layer 30 in addition to the stack 10. The fourth current collector layer 30 is arranged on the outer side than the second current collector layer 12 (opposite side to a side where the first current collector layer 11 is arranged in terms of the second current collector layer 12, outside the second current collector layer 12 in terms of the stacking direction). The fourth current collector layer 30 may be composed of metal foil, a metal mesh, etc., and is especially preferably composed of metal foil. Examples of metal constituting the fourth current collector layer 30 include Cu, Ni, Cr, Au, Pt, Ag, Al, Fe, Ti, Zn, Co and stainless steel. The thickness of the fourth current collector layer 30 is not specifically limited, and for example, is preferably 0.1 µm to 1 mm, and is more preferably 1 µm to 100 µm.

1.7.3. Fuse or PTC Layer 40

As shown in FIG. 1, when the stacked battery 100 includes the third current collector layer 20, a fuse or a PTC layer 40 may be included between the first current collector layer 11 and the third current collector layer 20. When the stacked battery 100 includes the fourth current collector layer 30, a fuse or a PTC layer (not shown) may be included between the second current collector layer 12 and the fourth current collector layer 30. The structure and effect of a fuse and a PTC layer are known as disclosed in Patent Literature 4 etc., and are obvious without any specific description. Having the ratio h/S of no less than 1 makes it possible to suppress, for example, heat generation in internal short circuits in the stacked battery 100 of the present disclosure. Thus, it can be said that in the stacked battery 100, a fuse or the PTC layer 40 is supplementally provided in case.

1.7.4. Outer Package Body 50

An outer package body 50 is preferably provided for the stacked battery 100 at least over side faces of the stack 10, whereby it can be suppressed that moisture etc. penetrates the stack 10 from side faces thereof. The outer package body 50 is not provided for the stacked battery 100 shown in FIG. 1 on one or the other end side in the stacking direction of the stack 10. In the stacked battery 100 shown in FIG. 1, the stack 10 is stored in a space demarcated by the third current collector layer 20, the fourth current collector layer 30 and the outer package body 50. The third current collector layer 20 and the fourth current collector layer 30 may be stored inside the outer package body 50 together with the stack 10.

1.7.5. Shape as Whole of Stacked Battery

The stacked battery 100 preferably has a shape corresponding to the stack 10 as a whole. That is, if the stack 10 has a shape of a quadratic prism, preferably, the outer package body 50 also has a shape of a quadratic prism and the stacked battery 100 has a shape of a quadratic prism as a whole. In the stacked battery 100, the ratio h/A (cm$^{-1}$) of the length h (cm) to a project area A (cm$^2$) of the stacked battery 100 viewed in the stacking direction (the maximum value of an area demarcated by the external surface of the outer package body 50 on a cross section orthogonal to the stacking direction) may be more than 1. When the ratio h/A is more than 1, the ratio h/S is always more than 1.

1.8. Function and Effect

According to findings of the inventor of the present application, it is effective to make a capacity C and a capacitance F of a battery small in order to suppress heat generation in the battery in internal short circuits. However, small capacity C and capacitance F make it difficult to secure energy E of a sufficient level. It is necessary to stack a plurality of electric elements to form a stacked battery in order to secure energy E of a sufficient level. According to findings of the inventor of the present application, in a stacked battery, energy E can be sufficiently increased (for example, no less than 1 Wh) by stacking a plurality of electric elements via bipolar current collectors so that the ratio (h/S) of a length h in the stacking direction of a stack to an electrode area S is more than 1. That is, in the stacked battery 100 having a bipolar structure, having the ratio (h/S) of the length h in the stacking direction of the stack 10 to the electrode area S of the stack 10 of more than 1 makes it easy to suppress heat generation in the battery in internal short circuits while increasing an energy level.

According to findings of the inventor of the present application, it is effective to narrow an electrode area S of a battery to reduce an uneven pressure to the interface of layers in order to suppress an unstable current when the battery is operated. However, a narrow electrode area S makes it hard to secure energy E of a sufficient level. It is necessary to stack a plurality of electric elements to form a stacked battery in order to secure energy E of a sufficient level. According to findings of the inventor of the present application, in a stacked battery, energy E can be sufficiently increased (for example, no less than 1 Wh) by stacking a plurality of electric elements via bipolar current collectors so that the ratio (h/S) of a length h in the stacking direction of a stack to an electrode area S is more than 1. That is, in the stacked battery 100 having a bipolar structure, having the ratio (h/S) of the length h in the stacking direction of the stack 10 to the electrode area S of the stack 10 of more than 1 makes it easy to suppress heat generation in the battery in internal short circuits while increasing an energy level.

2. Method for Producing Stacked Battery

The electric element 14 itself can be made by a known method. For example, when a solid-state battery is produced, the electric element 14 can be made by coating a surface of a cathode current collector layer (that can function as the first current collector layer 11 or the bipolar current collector layer 13) with a cathode material such as an active material in a wet process to dry the surface, to form the cathode active material layer 14a, coating a surface of an anode current collector layer (that can function as the second current collector layer 12 or the bipolar current collector layer 13) with an anode material such as an active material in a wet process to dry the surface, to form the anode active material layer 14b, transferring the electrolyte layer 14c containing a solid electrolyte etc. between the cathode active material layer 14a and the anode active material layer 14b, and integrally press-molding the layers. A pressing pressure at this time is not restricted, and for example, is preferably no less than 2 ton/cm$^2$. These making procedures are just an example, and the electric element 14 can be made by any procedures other than them. For example, the cathode active material layer 14a etc. can be formed by a dry process instead of a wet process. The stack 10 is obtained by stacking a plurality of the electric elements 14 made as described above while electrically connecting the electric elements 14 in series (in this case, the cathode current collector layer and the anode current collector layer are laminated to each other, to form the bipolar current collector layer 13). The stack 10 made as described above is, for example, sealed in the outer package body (battery case) of a laminate film, a stainless steel can, or the like, which makes it possible to make a solid-state battery as the stacked battery 100. These making procedures are just an example, and a solid-state battery can be made by any procedures other than them.

Alternatively, for example, the electric element 14 is made by arranging a separator instead of a solid electrolyte layer as described above, to form the stack 10 in the same manner as described above, and this stack 10 is, for example, sealed up in the outer package body (battery case) that is filled with an electrolyte solution, which makes it possible to produce a battery of an electrolyte solution system as the stacked battery 100. When a battery of an electrolyte solution system is produced, press-molding of the layers may be omitted.

3. Additional Notes

The description showed the stacked battery including both a battery of an electrolyte solution system and a solid-state battery. It is believed that the technique of the present disclosure exerts a more outstanding effect when applied to a solid-state battery where the electrolyte layer is a solid electrolyte layer (especially a sulfide solid-state battery whose solid electrolyte layer contains a sulfide solid electrolyte). Gaps in the electric elements are small in a solid-state battery compared to a battery of an electrolyte solution system, and a solid-state battery is hard and difficult to change its shape. Thus, even when a plurality of the electric elements are stacked in series so that the ratio h/S is more than 1, it is suppressed to, for example, change the shape of each electric element and it is difficult for short circuits of each electric element to occur. Further, in a solid-state battery, a constraint pressure to the stack tends to be high in order to lower the internal resistance in the electric elements. In this case, pressure to the interface of layers is easy to be uneven, and current is easy to be unstable when the battery is operated. In contrast, according to the stacked battery of the present disclosure, having the ratio h/S of more than 1 makes it easy to suppress such an unstable current. In other words, it is believed that the effect of the technique of the present disclosure is outstanding in the case of a solid-state battery more than in the case of a battery of an electrolyte solution system.

On the other hand, a battery of an electrolyte solution system is generally such that the electric element is immersed in an electrolyte solution with which a battery case is filled (such that an electrolyte solution is present not only in gaps between layers of the electric element but also outside the electric element). When a plurality of the electric elements are stacked, short circuits are easy to occur via an electrolyte solution etc. Such a problem can be solved by providing a means for preventing short circuits (such as providing a means for preventing an electrolyte solution from leaking out between the electric elements). However, as the ratio h/S is higher, the number of members for preventing short circuits tends to larger.

It is also considered that the electric elements are electrically connected to each other in parallel using a monopolar electrode etc., to form the stacked battery. However, in the stacked battery of a monopolar type, when a part of the electric elements short-circuit, a rounding current concentrates in the short-circuiting electric elements from the electric elements that do not short-circuit, and Joule heating is easy to be generated at short-circuiting portions. That is, heat generation in the battery in internal short circuits is large compared to the case where a plurality of the electric elements are electrically connected in series. Heat generation due to a rounding current as described above is hard to be suppressed even if the ratio h/S is large. In the stacked battery of the present disclosure, such a problem is avoided by employing a bipolar structure but not a monopolar structure.

EXAMPLES

1. Heat Generation Value of Electric Element in Short Circuits

Electric elements 1 to 3 were made as the following procedures, to evaluate a heat generation value in short circuits.

1.1. Electric Element 1

1.1.1. Making Cathode Active Material

Lithium niobate was coated over surfaces of particles of Li(Ni, Co, Mn, W)$O_2$ under an atmospheric pressure using a tumbling fluidized coating machine (manufactured by Powrex Corporation), to be calcined under an atmospheric pressure, thereby a cathode active material was obtained.

1.1.2. Making Cathode Active Material Layer

A solution of butyl butyrate and 5 wt % of a PVDF based binder (manufactured by Kureha Corporation), the cathode active material, a sulfide solid electrolyte ($Li_2S$—$P_2S_5$ base), and VGCF (manufactured by Showa Denko K.K.) as a conductive additive were added into a vessel made of PP, and stirred with an ultrasonic dispersive device (UH-50 manufactured by SMT Corporation) for 30 seconds. Next, the vessel was shaken with a mixer (TTM-1 manufactured by Sibata Scientific Technology Ltd.) for 30 minutes, and the inside thereof was further stirred with the ultrasonic dispersive device for 30 seconds. Thereafter, the vessel was further shaken for 3 minutes, to obtain a cathode mixture slurry. Aluminum foil (manufactured by Nippon Foil Manufacturing) was coated with the obtained cathode mixture slurry using an applicator according to a blade method. After air-dried, the aluminum foil was dried on a hot plate at 100° C. for 30 minutes, to form a cathode active material layer on the aluminum foil (60 μm in thickness).

1.1.3. Making Anode Active Material Layer

A solution of butyl butyrate and 5 wt % of a PVDF based binder (manufactured by Kureha Corporation), silicone particles (manufactured by Kojundo Chemical Laboratory Co., Ltd.) as an anode active material, and a sulfide solid electrolyte ($Li_2S$—$P_2S_5$ base) were added into a vessel made of PP, and stirred with an ultrasonic dispersive device (UH-50 manufactured by SMT Corporation) for 30 seconds. Next, the vessel was shaken with a mixer (TTM-1 manufactured by Sibata Scientific Technology Ltd.) for 30 minutes, and the inside thereof was further stirred with the ultrasonic dispersive device for 30 seconds. Thereafter, the vessel was further shaken for 3 minutes, to obtain an anode mixture slurry. Copper foil was coated with the obtained anode mixture slurry using an applicator according to a blade method. After air-dried, the copper foil was dried on a hot plate at 100° C. for 30 minutes, to form an anode active material layer on the copper foil (29 μm in thickness).

1.1.4. Making Electrolyte Layer

A solution of heptane and 5 wt % of a BR based binder (manufactured by JSR Corporation), and a sulfide solid electrolyte ($Li_2S$—$P_2S_5$ base) were added into a vessel made of PP, and stirred with an ultrasonic dispersive device (UH-50 manufactured by SMT Corporation) for 30 seconds. Next, the vessel was shaken with a mixer (TTM-1 manufactured by Sibata Scientific Technology Ltd.) for 30 minutes, and the inside thereof was further stirred with the ultrasonic dispersive device for 30 seconds. Thereafter, the vessel was further shaken for 3 minutes, to obtain an electrolyte slurry. A surface of a base material was coated with the obtained electrolyte slurry using an applicator according to a blade method. After air-dried, the base material was dried on a hot plate at 100° C. for 30 minutes, to form an electrolyte layer on the base material (30 μm in thickness).

1.1.5. Making Electric Element

After the layers were cut into a shape of a battery, the solid electrolyte layer was layered on a surface of the anode active material layer, to be pressed at a pressure equivalent to 4 ton/$cm^2$ using CIP (manufactured by Kobe Steel, Ltd.). Thereafter, the aluminum foil was removed from the surface of the solid electrolyte layer, and the cathode active material layer was layered on this surface, to be pressed at a pressure equivalent to 4 ton/$cm^2$ in the same manner, to obtain the electric element 1 having the structure of aluminum foil/cathode active material layer/solid electrolyte layer/anode active material layer/copper foil. The capacity C of the electric element 1 was 0.32 Ah.

1.2. Electric Element 2

The electric element 2 was made in the same manner as the electric element 1 except that the areas of the cathode active material layer and the anode active material layer were changed and the capacity C was 0.1 Ah.

1.3. Electric Element 3

The electric element 3 was made in the same manner as the electric element 1 except that the areas of the cathode active material layer and the anode active material layer were changed and the capacity C was 0.8 Ah.

1.4. Evaluation of Heat Generation Value in Short Circuits

The made electric elements 1 to 3 were charged from 0 V to 4.55 V, discharged from 4.55 V to 3 V, and further charged to 4.35 V, while a certain constraint pressure was applied thereto. After the charging, each of the electric elements was penetrated by a nail (8 mm in diameter, 60 degrees in point angle) at 25 mm/sec in velocity to be short-circuited, and the heat generation values of the electric elements when the electric elements were short-circuited were confirmed. The heat generation values were roughly estimated by means of a thermocouple disposed at the tip of the nail, using the maximum temperature change value before and after the electric elements were short circuited. Since accurate specific heats of the electric elements were uncertain, the heat generation values were compared by standardizing the values in terms of 0.32 Ah.

heat generation value $P=c*\rho*V*\Delta T/t$ (P: heat generation value, c: specific heat of electric element, $\rho$: density of electric element, V: volume of electric element, $\Delta T$: temperature change, t: time)

The results are shown in the following Table 1.

TABLE 1

| | Capacity C (Ah) | Standardized heat generation value |
|---|---|---|
| Electric element 1 | 0.32 | 1 |
| Electric element 2 | 0.1 | 0.2 |
| Electric element 3 | 0.8 | 8.8 |

As is apparent from the results shown in Table 1, it is found that having the capacity C of the electric element of no more than 0.32 Ah makes it possible to significantly suppress heat generation in short circuits. Here, having the capacity of the electric element of no more than 0.32 Ah leads to a low energy level of the battery. It is necessary to stack a plurality of the electric elements to form the stacked battery in order to secure a sufficient energy level.

When the electric elements are electrically connected in series via bipolar current collectors to obtain the stacked battery, the capacity of whole of the stacked battery is equivalent to that per electric element. That is, it can be said that when a plurality of the electric elements, the capacity of each of which is no more than 0.32 Ah, are connected in series to form the stacked battery, heat generation is suppressed even when internal short circuits occur in the stacked battery.

Here, according to findings of the inventor of the present application, when the capacity of the electric element is as low as, for example, no more than 0.32 Ah, the number of stacking the electric elements has to be adjusted so that the ratio (h/S) of the length h of the stack to the electrode area S of the stacked battery is more than 1 in order to secure a sufficient energy level (for example, no less than 1 Wh) as a whole of the stacked battery. In other words, it can be said to be effective in the stacked battery to have the ratio h/S of more than 1 in order to suppress heat generation in the battery in internal short circuits while increasing an energy level.

2. Cycle Characteristics (Unstable Current) of Battery

Electric elements 4 to 6 were made as the following procedures, to evaluate cycle characteristics.

2.1. Electric Element 4

A cathode active material layer, an anode active material layer, and an electrolyte layer were made in the same manner as the electric element 1. The layers were laminated to form the electric element 4. Here, the coating amount of a slurry and the degree of laminating the cathode active material layer, the anode active material layer and the electrolyte layer in stacking were adjusted so that the electrode area S was 10 cm$^2$.

2.2. Electric Element 5

The electric element 5 was made in the same manner as the electric element 4 except that the electrode area S was 1 cm$^2$.

2.3. Electric Element 6

The electric element 6 was made in the same manner as the electric element 4 except that the electrode area S was 100 cm$^2$.

2.4. Evaluation of Cycle Characteristics

The made electric elements 4 to 6 as a certain constraint pressure was applied thereto were charged from 0 V to 4.55 V and discharged from 4.55 V to 3 V, and thereafter charging to 4.35 V and discharging to 3 V were repeated. As a result, as shown in the following Table 2, an unstable current in charging/discharging was suppressed in the electric element 4 and the electric element 5, which had a narrow electrode area S, and cycle characteristics of these electric elements 4 and 5 were good. Here, the electrode area S of no more than 10 cm$^2$ leads to a low energy level of the battery. It is necessary to stack a plurality of the electric elements to form the stacked battery in order to secure a sufficient level of energy.

TABLE 2

| Area/cm2 | Capacity retention after 10 cyc. |
|---|---|
| 1 | 91% |
| 10 | 89% |
| 100 | 80% |

Here, according to findings of the inventor of the present application, if the electrode area S is as small as, for example, no more than 10 cm$^2$, it is necessary to adjust the number of stacking the electric elements so that the ratio (h/S) of the length h of the stack to the electrode area S of the stacked battery is more than 1 in order to secure a sufficient energy level (for example, no less than 1 Wh) as a whole of the stacked battery. In other words, it can be said to be effective in the stacked battery to have the ratio h/S of more than 1 in order to suppress an unstable current when the battery is operated, while increasing an energy level.

As described above, it was found that in the stacked battery, having the ration h/S of the length h in the stacking direction of the stack to the electrode area S of more than 1 makes it easy to suppress heat generation in the battery in internal short circuits and an unstable reaction when the battery is operated while increasing an energy level.

The Examples showed the case where a solid-state battery as an electric element using specific materials was made. However, the technique of the present disclosure is not limited to this. The same effect is brought about even when a solid-state battery is composed as the electric element using materials other than the above and a plurality of them are stacked in series to form a stacked battery, by having the ratio h/S of the stack of more than 1. The same effect is brought about even when a battery of an electrolyte solution system is composed, by having the ratio h/S of the stack of more than 1.

INDUSTRIAL APPLICABILITY

The stacked battery according to this disclosure can be used as a power source in a wide range such as a small-sized power source for portable devices and an onboard large-sized power source, and is especially preferable as a large-sized power source such as an onboard power source.

REFERENCE SIGNS LIST 100 stacked battery
  10 stack
    11 first current collector layer
    12 second current collector layer
    13 bipolar current collector layer
    14 electric element
      14a cathode active material layer
      14b anode active material layer
      14c electrolyte layer
  20 third current collector layer
  30 fourth current collector layer
  40 fuse or PTC layer
  50 outer package body

The invention claimed is:

1. A stacked battery comprising a stack, wherein
the stack comprises a first current collector layer that comprises one end face in a stacking direction of the stack, a second current collector layer that comprises another end face in the stacking direction, a plurality of bipolar current collector layers that are arranged between the first and second current collector layers at intervals in the stacking direction, and a plurality of electric elements that are electrically connected to each other in series via the bipolar current collector layers between the first and second current collector layers,
each of the electric elements comprises a cathode active material layer, an anode active material layer, and a sulfide solid electrolyte layer that is arranged between the cathode and anode active material layers,
a plurality of electrode areas S' of all of the plurality of the electric elements, which compose the stack, has a maximum value of S'max that is defined as an electrode area S on a cross section orthogonal to the stacking direction of the stack,
a ratio (S'min/S'max) of a minimum value S'min and the maximum value S'max of the plurality of electrode areas S' is 0.9 to 1.0,
a ratio h/S (cm$^{-1}$) of a length h (cm) between the one end face and the other end face in the stacking direction of the stack to the electrode area S (cm$^2$) on the cross section orthogonal to the stacking direction of the stack is more than 1,
a capacity is no more than 0.32 Ah,
the electrode area S is 1 cm$^2$ to 10 cm$^2$,
a capacitance is no more than 0.01 Ah/V,
a voltage is 10 V to 2000 V,
the stacked battery further comprises a third current collector layer that is arranged on an outer side of the first current collector layer, in addition to the stack, and
a fuse or a PTC layer is provided between the first and third current collector layers.

2. The stacked battery according to claim 1, wherein the ratio h/S (cm$^{-1}$) is more than 10.

3. The stacked battery according to claim 1, further comprising:
a fourth current collector layer that is arranged on an outer side of the second current collector layer, in addition to the stack.

4. The stacked battery according to claim 3, wherein another fuse or another PTC layer is provided between the second and fourth current collector layers.

5. The stacked battery according to claim 1, wherein
a thickness of the cathode active material layer is 20 μm to 2 mm, and
a thickness of the anode active material layer is 20 μm to 2 mm.

6. The stacked battery according to claim 1, wherein the fuse or the PTC layer contacts an outer package body of the stacked battery.

* * * * *